United States Patent [19]

Ohbora

[11] 4,133,453

[45] Jan. 9, 1979

[54] TONER RESIDUAL AMOUNT DETECTING DEVICE

[75] Inventor: Shinichiro Ohbora, Kawasaki, Japan

[73] Assignee: Tokyo Shibaura Electric Co., Ltd., Kawasaki, Japan

[21] Appl. No.: 751,477

[22] Filed: Dec. 16, 1976

[30] Foreign Application Priority Data

Dec. 18, 1975 [JP] Japan .............................. 50-150189
Jun. 16, 1976 [JP] Japan ................................ 51-69711
Jul. 19, 1976 [JP] Japan ................................ 51-85012

[51] Int. Cl.² .......................... B67D 5/32; G08B 7/06
[52] U.S. Cl. ................................. 222/39; 73/304 C; 222/DIG. 1; 340/617
[58] Field of Search .................... 73/304 C, 308; 340/244 C, 246; 324/61 R; 222/DIG. 1, 23; 335/3 DD

[56] References Cited

U.S. PATENT DOCUMENTS

| 3,301,056 | 1/1967 | Blanchard et al. | 73/304 C |
| 3,375,716 | 4/1968 | Hersch | 73/304 C |
| 3,498,500 | 3/1970 | Hansen | 222/DIG. 1 X |
| 3,520,445 | 7/1970 | Hansen | 222/DIG. 1 |
| 3,533,286 | 10/1970 | Westcott et al. | 73/304 C |
| 3,706,980 | 12/1972 | Maltby | 73/304 C X |

Primary Examiner—Daniel M. Yasich
Attorney, Agent, or Firm—Oblon, Fisher, Spivak, McClelland & Maier

[57] ABSTRACT

A toner residual amount detecting device for detecting a residual amount of toner in a toner hopper, comprises a capacitor section constructed of at least two electroconductive plates oppositely arranged in a toner-filled hopper, and an electric circuit portion adapted to detect a capacitance between the electroconductive plates which is varied according to a residual amount of toner in the toner hopper.

4 Claims, 15 Drawing Figures

TONER RESIDUAL AMOUNT DETECTING DEVICE

BACKGROUND OF THE INVENTION

This invention relates to a toner residual amount detecting circuit associated with a toner supply mechanism in a dry type electrophotographic apparatus.

A developing agent for use in a dry type electrophotographic apparatus generally consists of a toner which is deposited onto a latent image of a photoconductive drum and a carrier for carrying the toner, or a toner alone. Such a toner is consumed by development and it is necessary to supply a toner. Recently an electrophotographic apparatus is connected to a computer and it is used as an output device of the computer. There arises the necessity of detecting a residual amount of toner.

A toner residual amount detecting device is known which is adapted to detect a residual amount of toner in a toner hopper by its weight. The device is adapted to detect a residual amount of toner in response to the operation of a microswitch adapted to be opened when the whole weight of the toner-filled hopper is lowered to below a predetermined level. Since in such device the toner hopper is required to be floated, a holding mechanism for the toner hopper becomes complicated in design.

Another residual amount detecting device is adapted to detect a toner-carrier mixed ratio of the developing agent by a variation in the inductance of a coil embedded in the developing agent.

Another residual amount detecting device is adapted to magnetically detect a residual amount of toner. According to this magnetic device a magnet is disposed at the lower portion of a toner hopper in which magnetized carrier and toner are received. When the magnet is attracted toward, and repelled from, the toner hopper in accordance with an amount of toner in the toner hopper a microswitch is operated in accordance with the movement of the magnet and a residual amount of toner is detected according to the operation of the microswitch.

In the last-mentioned two devices a residual amount can not be detected if a developing agent consists of a toner alone.

SUMMARY OF THE INVENTION

It is accordingly the object of this invention to provide a static type toner residual amount detecting device which is simple in construction and can be applied even when a toner alone is used.

According to this invention there is provided a toner residual amount detecting device comprising a capacitor section comprised of at least two electroconductive plates oppositely arranged in a toner-filled hopper, and an electric circuit portion adapted to detect a capacitance between the electroconductive plates which is varied according to a variation in an amount of tones in the tone hopper.

BRIEF DESCRIPTION OF THE DRAWING

This invention will be further described by referring to the accompanying drawings in which.

DETAILED DESCRIPTION OF THE INVENTION

Electroconductive plates are oppositely disposed in a toner utilizing the fact that a toner has a dielectric constant different from that of the atmosphere (four times as large as that of the atmosphere). A capacitance between the electroconductive plates is decreased with a decrease in the amount of toner. This invention is based on this principle.

Figure 1:
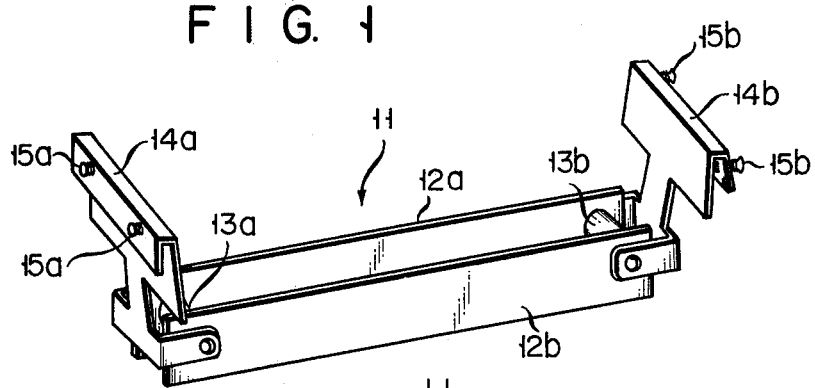
FIG. 1 is a perspective view of a capacitor structure of a toner residual amount detecting device according to one embodiment of this invention.

In FIG. 1 is shown a capacitor structure 11 of a toner residual amount detecting device according to one embodiment of this invention.

Figure 3:
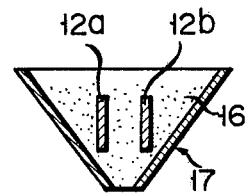
FIG. 3 is a cross section showing the toner hopper in FIG. 2 and the FIG. 1 capacitor structure mounted in the toner hopper.
Figure 2:
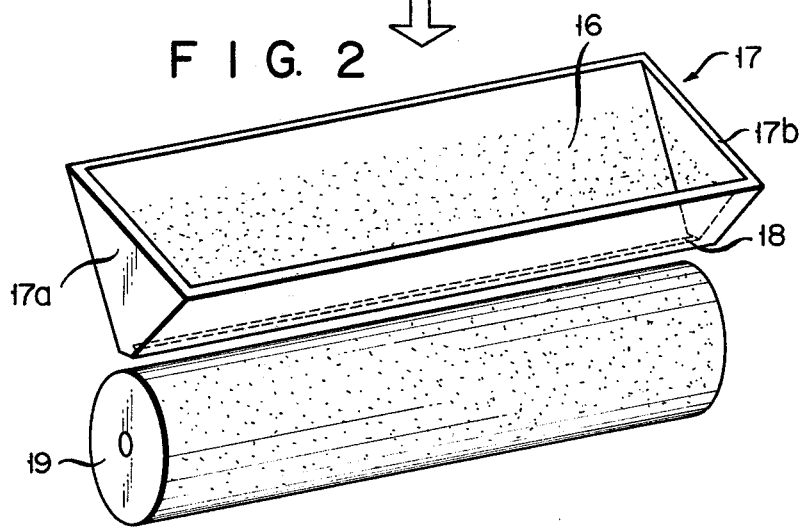
FIG. 2 is a perspective view showing a toner hopper on which is the capacity structure in FIG. 1 is mounted and a magnetic roller disposed below the toner hopper.

A pair of oblong or rectangular electroconductive plates 12a, 12b are oppositely arranged with a pair of insulating members 13a, 13b interposed therebetween one at each end portion of the electroconductive plates. A pair of support fittings 14a, 14b made of insulating material are mounted one on each end of the electroconductive plates. The capacitor structure 11 is mounted on a metallic toner hopper 17 with the electroconductive plates vertically disposed as shown in FIG. 2. The metallic toner hopper is filled with a toner 16. In this case, the support fittings 14a and 14b are hung on, and secured by screw 15a, 15b to the opposite end walls 17a and 17b of the hopper 17. FIG. 3 is a cross-sectional view showing the state in which the capacitor structure 11 is mounted on the toner hopper 17. A slit-like toner outlet 18 is provided in the bottom of the toner hopper 17 and a magnetic roller 19 is disposed opposite to the toner outlet 18. The magnetic roller 19 is rotatable around its axis and a plurality of electromagnets (not shown) are provided in the roller 19 so that N and S poles are alternately provided in the direction of the outer periphery of the roller. When a toner powder formed by covering the toner (i.e. a mixture of for example, $Fe_3O_3$ and epoxy resin) with carbon is dropped onto the magnetic roller 19, the toner is attracted toward a magnetic brush formed on the magnetic roller 9. With the rotation of the magnetic roller the toner is carried onto the surface of a photoconductive drum or a specific paper in an electrophotographic apparatus (not shown) and attracted to a latent image area on the surface of the photoconductive drum or the specific paper to develope the latent image.

When in this way the toner is supplied through the magnetic roller 19 to the latent image area on the surface of the photoconductive drum with the result that the toner in the hopper is decreased, the electroconductive plates 12a and 12b embedded in the toner are exposed, resulting in a decrease in a capacitance between the electroconductive plates, i.e., a capacitance of the capacitor structure. The decrease of the capacitance is detected at an electric circuit arrangment or section 20 shown in FIG. 4. In the circuit section shown in FIG. 4 a trigger pulse generator 21 is connected to monostable multi-vibrators 22 and 23, and the capacitor structure 11 made of the electroconductive plates 12a and 12b is connected to a capacitor circuit C in a CR circuit where the duration time of the metastable state of the monostable multivibrator 22 is determined. Unless the capacitor structure 11 has a suitable capacity, an additional capacitor may be connected. A variable resistor 24 is connected to a resistor circuit R in a CR circuit in the other multivibrator 23. By adjusting the variable resistor 24 the monostable multivibrator 23 is set to have a metastable time substantially equal to the metastable time of the multivibrator 22 when the capacitance of the capacitor structure 11 is lowered to a value necessary for the toner to be supplied to the toner hopper. The outputs of the monostable multivibrators 22 and 23 are connected through an AND gate 25 to a retrigger multivibrator 26 and the output of the retrigger multivibrator 26 is connected to an alarm 27 for alarming that a tone becomes a low level.

The operation of the toner residual amount detecting device will now be explained below.

Figure 5:
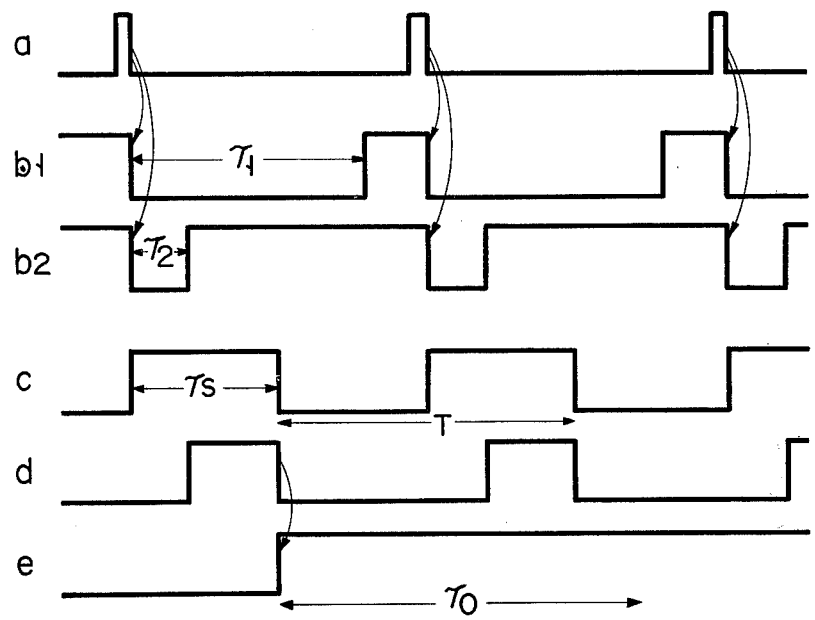
FIG. 5 shows a time chart corresponding to each part of the circuit section in FIG. 4.

When the trigger pulse generator 21 generates a trigger pulse (a waveform a in FIG. 5) with a cycle of 2000 nano sec. the multivibrator 22 is triggered by the trigger pulse to generate from the output terminal Q an output signal having a waveform b1 or b2 or a waveform whose metastable time is $\tau_2 \leq \tau \leq \tau_1$. When the toner 16 is filled in the toner hopper 17 and the capacitor structure 11 and thus the electroconductive plates 12a and 12b are completely embedded in the toner, $\tau = \tau_1$ (for example, 1000 nano sec.)

Since the toner has a dielectric constant four times as large as that of the atmosphere, $\tau$ becomes small as the toner within the toner hopper is decreased through a supply of the toner to the magnetic roller. As a result, $\tau$ becomes smaller than the metastable time $\tau_s$ of the output (a waveform c in FIG. 5) of the monostable multivibrator the AND gate 25 generates an output of a waveform d in FIG. 5. The output of the AND gate 25 is supplied to the retrigger monostable multivibrator 26 to cause the retrigger multivibrator 26 to be triggered. If the retrigger multivibrator 26 is retriggerd when in the metastable state, the metastable state of the retrigger multivibrator 26 continues into that metastable time of the trigger multivibrator which is started by the retriggering of the multivibrator. If a CR time constant of the retrigger multivibrator it is so set that a metastable time $\tau_0$ of the retrigger multivibrator becomes greater than a cycle T of the output pulse of the AND gate 25, the retrigger multivibrator 26 maintains its metastable state as shown in a waveform e in FIG. 5 when $\tau < t_s$. The output signal of the retrigger multivibrator 26 operates the alarm 27, for example, illuminates an alarm lamp, indicating that a residual amount of toner becomes a low level.

The above-mentioned embodiment, though simple in construction, permits a residual amount of toner to be relatively accurately detected. The residual amount of toner can be set to a proper level by suitably adjusting the variable resistor 24.

Although the above-mentioned embodiment uses the retrigger monostable multivibrator 26, use may be made of an integral circuit for integrating the output of the AND gate 25. In this case, a maximum integral value of the integral circuit should be restricted to such a value that the alarm lamp can be lighted.

Figure 6A:
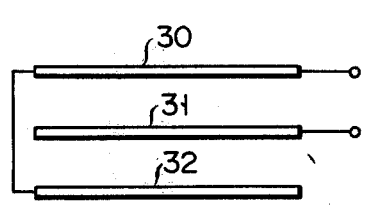
FIGS. 6A and 6B show modified capacitor structures, respectively.
Figure 6B:
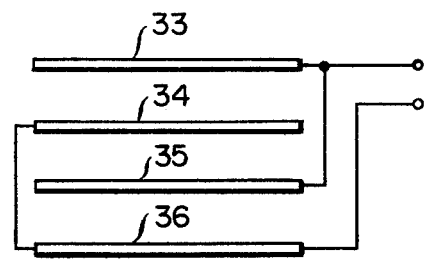

Although in the above-mentioned embodiment the capacitor structure 11 is comprised a pair of oppositely arranged electroconductive plates, three or more electroconductive plates may be used as shown in FIGS. 6A and 6B. In an arrangement shown in FIG. 6A three electroconductive plates 30, 31 and 32 are parallely oppositely arranged with the electroconductive plate 31 in between. The even numbered electroconductive plates 30 and 32 are electrically connected to each other and the electroconductive plates 30 and 31 are taken out as capacitor electrodes. In an arrangement shown in FIG. 6B, four electroconductive plates 33, 34, 35 and 36 are parallely arranged with the adjacent two electroconductive plates oppositely facing each other. The odd-numbered electroconductive plates 33 and 35 are electrically connected to each other and constitutes one electrode of a capacitor. The even numbered electroconductive plates 34 and 36 are electrically connected to each other and constitutes the other electrode of the capacitor.

Figure 7A:
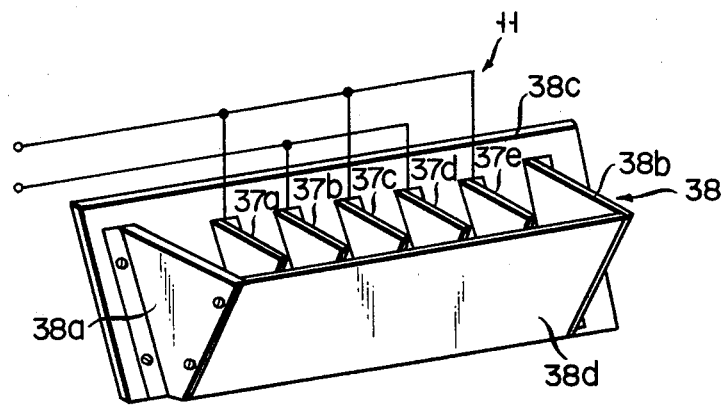
FIGS. 7A, 7B and 7C are a perspective view, plan view and cross-sectional view, respectively, showing a capacitor structure according to another embodiment of this invention.
Figure 7B:
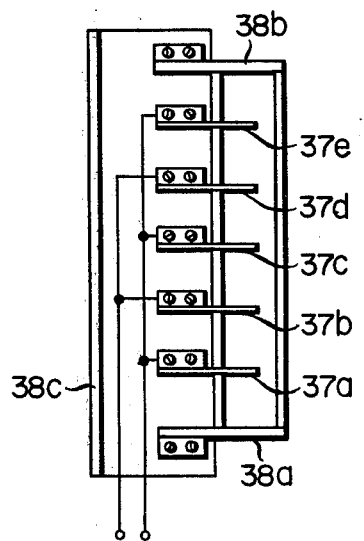
Figure 7C:
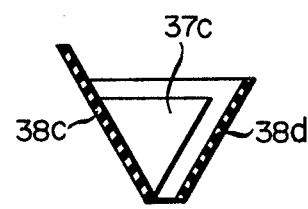

Alternatively, the capacitor structure 11 may be formed as shown in FIGS. 7A, 7B and 7C. In an arrangement shown in FIG. 7 electroconductive plates 37a, 37b, 37c, 37d and 37e have a shape corresponding to the cross section of a toner hopper 38, i.e., have a triangular shape. These electroconductive plates 37a . . . 37e are equidistantly arranged parallel to end plates 38a and 38b of the toner hopper 38 and secured by screws to side plates 38c and 38d. The odd numbered electroconductive plates 38a, 37c and 37e are connected in common with each other and constitute one electrode of a capacitor, and the even numbered electroductive plates 37b and 37d are connected to each other and taken out as the other electrode of the capacitor.

Since in the embodiment shown in FIGS. 7A to 7C the electroconductive plates have a shape corresponding to the cross section of the toner hopper so that the lower portions of the electroconductive plates are disposed adjacent to the bottom of the toner hopper a residual amount of toner can be detected even when it becomes a very low level. Although this embodiment uses five electroconductive plates, this invention is not restricted thereto. A plurality of electroconductive plates may be used instead. If a distance between the electroconductive plates is made too narrow a smooth flow of toner is prevented. It is therefore preferred that such a distance be restricted to be about 15 mm at least.

The electric circuit section of the residual amount device according to the above-mentioned embodiment will now be described by referring to FIG. 8.

Figure 4:
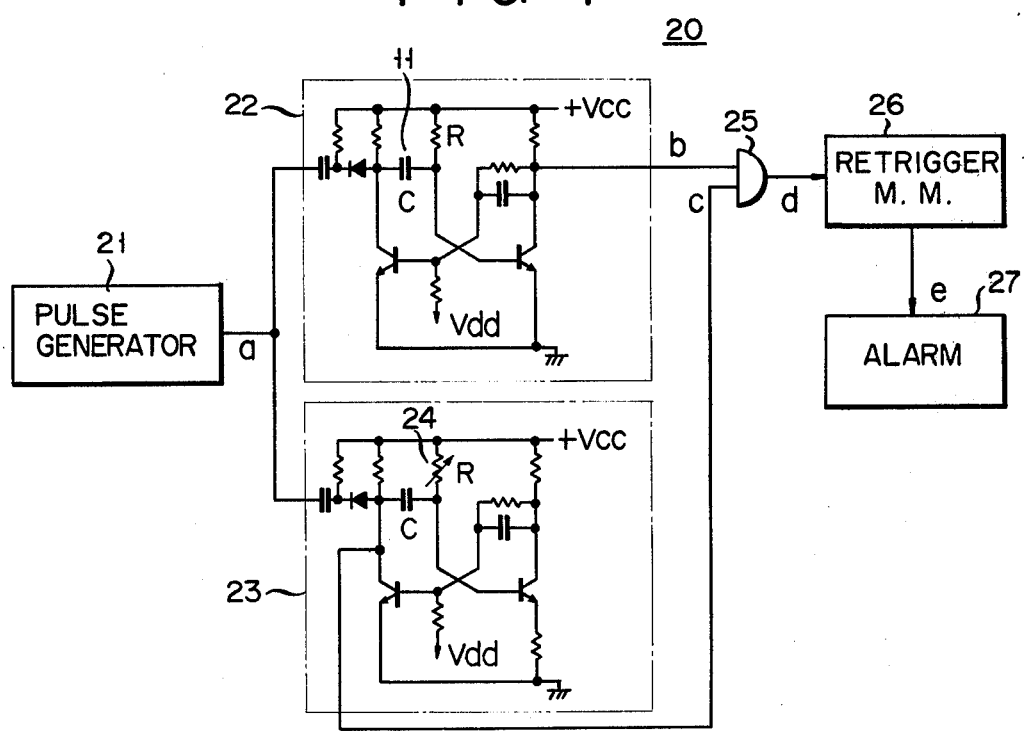
FIG. 4 is a circuit diagram showing an electric circuit section of the toner residual amount detector.

Since a circuit portion up to and including a retrigger multivibrator 26 is the same as the circuit shown in FIG. 4 further explanation is therefore omitted. An output Q of the retrigger multivibrator 26 is connected through a resistor 40 to the base of an NPN transistor 41 and an output Q of the retrigger multivibrator 26 is connected through a resistor to the base of an NPN transistor 43. The base of the transistor 41 is grounded through a collector-emitter path and also through a capacitor 44. The transistor 41 have an emitter grounded and a collector connected through a light emitting diode (LED) 45 and resistor 46 to a power supply.

Figure 8:
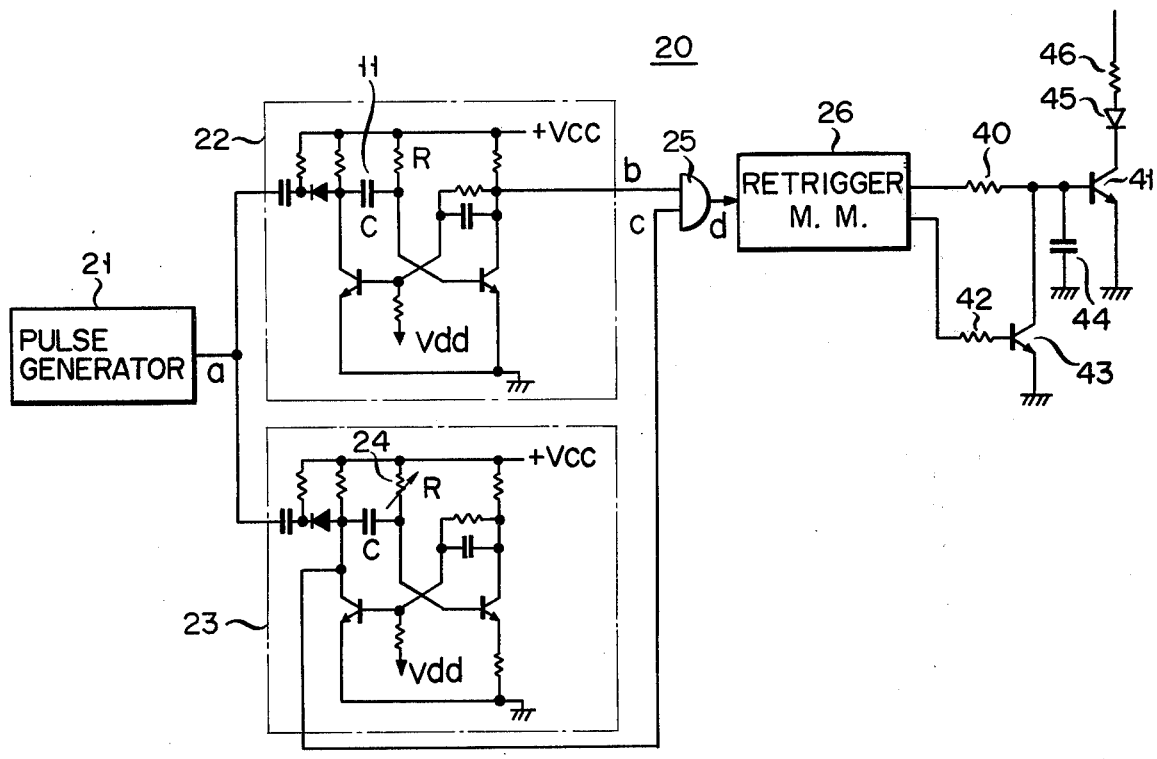
FIG. 8 is a circuit diagram showing a modified electric circuit section.

According to the circuit section shown in FIG. 8 the trigger pulse generator 21, multistable multivibrators 22 and 23, AND gate 25 and retrigger monostable multivibrator 26 generate output pulse signals a, b1 (or b2), c, d and e, respectively, in timing the same as the corresponding circuit elements as shown in FIG. 4 do. The output pulse signal of the retrigger multivibrator 26 is integrated by an integral circuit consisting of the resistor 40 and capacitor 44 to provide a signal having a waveform f in FIG. 9. The integral signal f is supplied to the base of the transistor 41. When, however, the integral signal f exceeds a predetermined level Vb, the transistor 41 is rendered conductive, lighting LED45. The level Vb is so set as to have a value smaller than the integral value of an output produced from the multivibrator 26 when at least two trigger pulses are supplied to the multivibrator 26.

Figure 9:
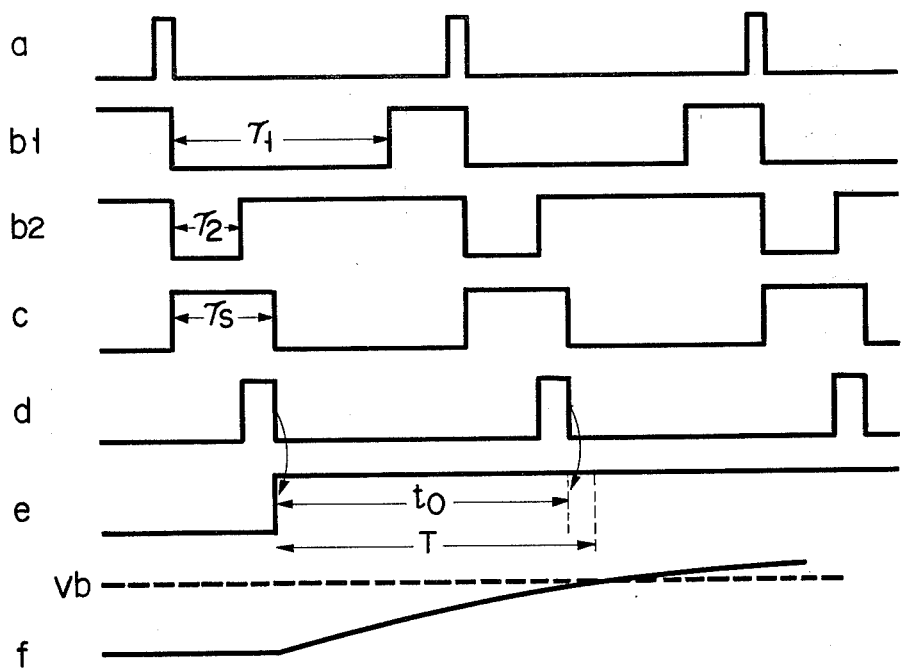
FIG. 9 shows a time chart corresponding to each part of the electric circuit section in FIG. 8.

In a situation where the metastable time $\tau_2$ of the monostable multivibrator 22 approximates the metastable time $\tau_s$ of the monostable multivibrator 23, as shown by a waveform b' in FIG. 9, the metastable time $\tau_2$ of the monostable multivibrator becomes longer than the metastable time $\tau_s$ of the monostable multivibrator 23 at some instance and becomes shorter than the metastable time $\tau_s$ of the metastable multivibrator at other instance. Such a variation is caused by a slight vibration of toner as resulting from the vibrations etc. of a motor of an electrophotographic apparatus.

As a result, the AND gate 25 generates an output having a waveform c' in FIG. 9 and even when the retrigger multivibrator 26 adapted to be triggered by the output of the AND gate 25 generates an output having a waveform e' in FIG. 9 and an integral output f' corresponding to the output signal e' does not exceed the level Vb. The transistor 41 remains nonconductive and LED 45 is not lighted. Even when $\tau_2$ is varied due to the vibration of the motor in a case where $\tau_2$ approximates $\tau_s$, LED 45 provides no flickering alarm display.

Figure 10:
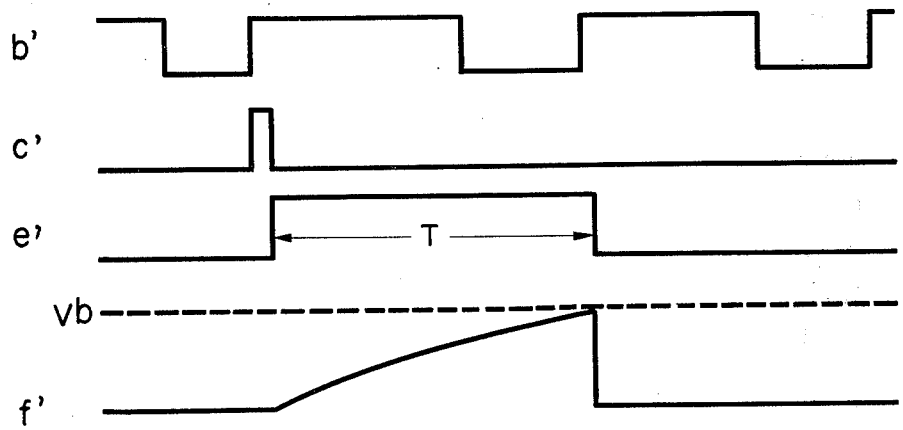
FIG. 10 is a circuit diagram showing a modified circuit section of the toner residual amount detecting device.
Figure 10:
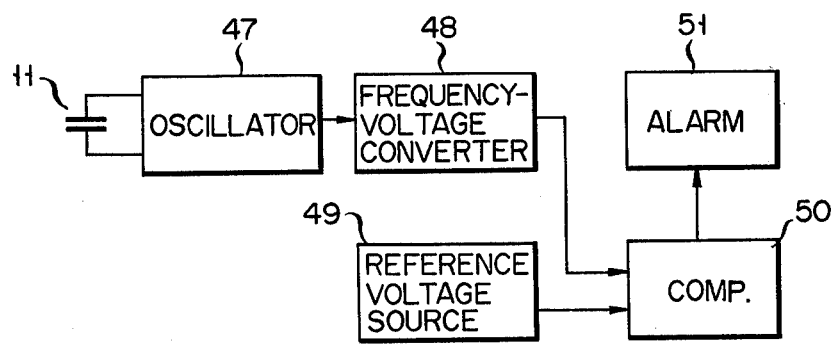

Although the electric circuit section of the above-mentioned embodiment utilizes a variation in the metastable time of the monostable multivibrator, this circuit section may be replaced by an electric circuit section as shown in FIG. 10. That is, a capacitor structure 11 constructed of the electroconductive plates is connected to a capacitor circuit in an oscillator 47 whose oscillation frequency is varied by varying the capacitance of the capacitor structure. The output of the oscillator 47 is supplied to a frequency-voltage converter 48 for voltage conversion. The output voltage of the converter 48 is supplied, together with a reference voltage of a reference voltage source 49, to a comparator 50 where a comparison is made between the output voltage of the converter 48 and the reference voltage of the reference voltage source. The reference voltage is so set as to have a value the same as that of an output voltage generated from the converter 48 when a residual amount of toner in the hopper 17 or 38 becomes a low level necessary for the toner to be supplied to the toner hopper. When the electric circuit section is so constructed that as the capacitance of the capacitor structure 11 decreases with a decrease in the residual amount of toner the output voltage of the converter 48 becomes a higher level, the output voltage of the converter 48 becomes higher than the reference voltage and the comparator 50 generates an output. As a result, an alarm is operated.

In the above-mentioned embodiment the capacitor structure may be connected to an indicator meter so that a residual amount of toner corresponding to a variation in a capacitance of the capacitor is displayed on the indicator meter.

In a case where the toner hopper is made of an electroconductive material the inner side surfaces of the toner hopper are treated with an insulating material so as to prevent the electroconductive plates from being short-circuited. The inner surface of the tonner hopper and conductive plates may be treated with teflon to facilitate a smooth supply of toner.

Figure 11:
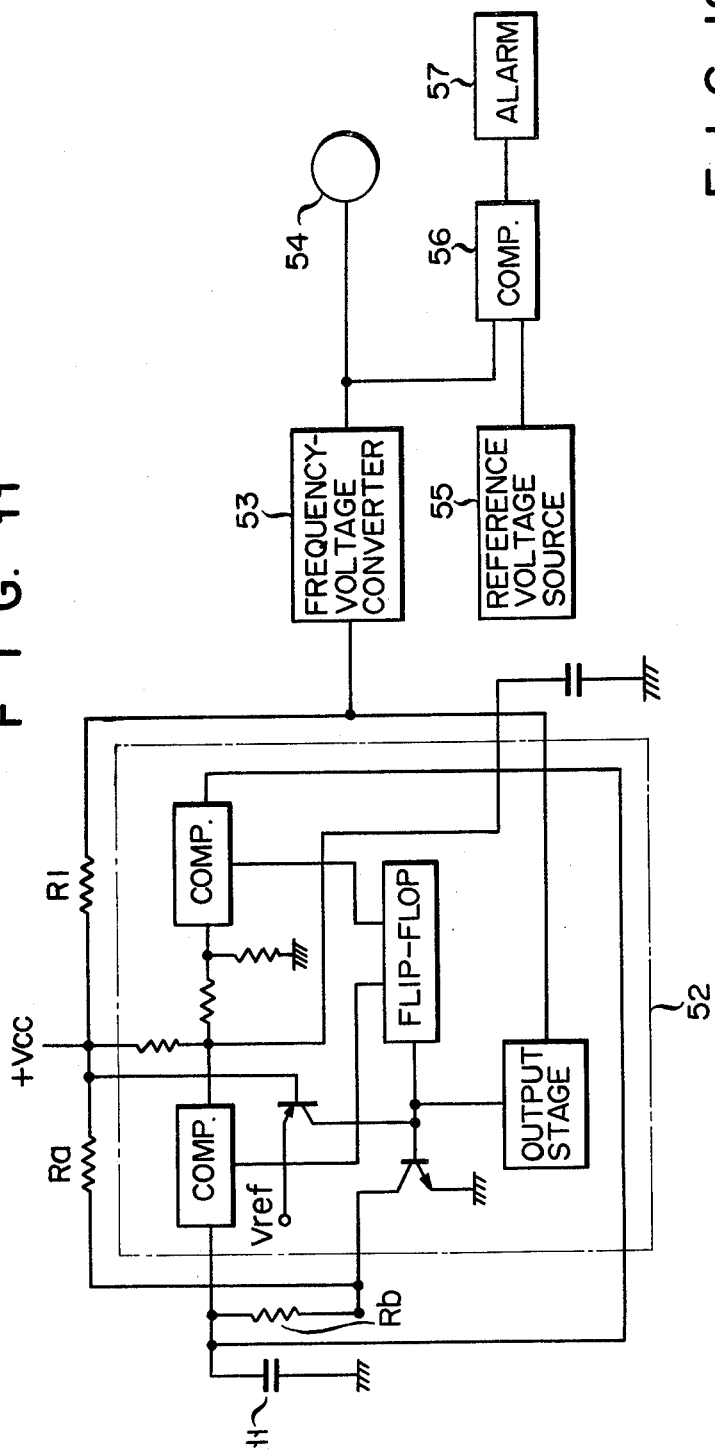
FIG. 11 is a circuit diagram showing another modified electric circuit section.

FIG. 11 shows an electric circuit section of a toner residual amount detecting device when a tonner hopper made of an electroconductive material or metal constitutes one electrode of a capacitor structure 11. When the electroconductive toner hopper is used, it is usually grounded. In consequence, the electric circuit section should be so constructed as to be applied to the grounded capacitor structure. In this embodiment a highly stable controller (for example, NE/SE555 monolithic timing circuit manufactured by Intersil) 52 is used as an oscillator. The capacitor structure 11 is charged through resistors Ra and Rb, and through the resistor Rb alone. Now suppose that the capacitance of the capacitor structure 11 is C. Then, an output signal having a frequency of $f = (1.46/(Ra+2Rb)C)$ is generated. The output signal of the controller 52 is supplied to a frequency converter 53 for conversion to a signal having a voltage level corresponding to the above-mentioned frequency. This voltage level is measured by a voltmeter 54 in an analog way. This voltage signal, together with the reference voltage of a reference voltage source 55 adapted to generate the same voltage as in the reference voltage source in FIG. 10, is supplied to a comparator 56 for comparison. The output of the comparator 56 is supplied to an alarm 57 so as to drive the latter.

As will be evident from the above, this invention provides a toner residual amount detector which is simple in construction and capable of relatively accurately detecting a residual amount of toner by connecting a capacitor structure to an electric circuit for driving an alarm in response to a decrease in the capacitance of the capacitor, the capacitance structure being constructed of at least two electroconductive plates oppositely arranged in a toner hopper and having its capacitance decreased with a decrease in a residual amount of toner.

Figure 12:
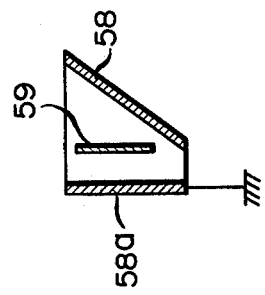
FIG. 12 is a sectional view of another capacitor structure.

In this embodiment, the toner hopper 58 having a vertical wall 58a as shown in FIG. 12 is used as one electrode of the capacitor structure 11 and an electroconductive plate 59 is provided in parallel with the vertical wall 58a. If the hopper is so constructed, no possible accident occurs between the vertical wall 58a and the electroconductive plate and it is possible to accurately measure a correct amount of toner at all times.

What is claimed is:

1. A toner residual amount detecting device detecting a residual amount of toner in a longitudinal toner hopper having a toner outlet at the bottom thereof and a triangular cross section, comprising:

a capacitor structure constituted by a plurality of electroconductive plates each having a triangular shape corresponding to the cross section of the toner hopper and facing spaced equidistantly at a predetermined internal of at least 15 mm to form a capacity therebetween and vertically disposed in the toner hopper with the surface of the plates perpendicular to a longitudinal axix of the toner hopper, the capacity being varied in correspondence with the change of the residual amount of toner received in the toner hopper having the capacitor structure and the odd numbered electroconductive plates being connected in common with each other to constitute one electrode of the capacitor structure while the even numbered electroconductive plates are connected in common with each other to constitute the other electrode;

a capacity detecting circuit for detecting the capacity of the capacitor structure to produce an electric signal corresponding to the capacity of the capacitor structure; and means for responding to the electric signal from the capacity detecting circuit to indicate the residual amount of the toner.

2. A residual amount detecting device according to claim 1 in which the capacity detecting circuit comprises:

a trigger pulse generator for generating a trigger pulse;

a first monostable multivibrator whose time constant circuit includes the capacitor structure having a capacitance and which is adapted to be triggered by the trigger pulse from the trigger pulse generator, the first monostable multivibrator having a metastable time being varied according to the capacitance of the capacitor structure;

a second monostable multivibrator adapted to be triggered by the output pulse of the trigger pulse generator and having its metastable time selectively set;

a gate circuit to which are supplied output pulses of the first and second monostable multivibrator; and a retrigger monostable multivibrator adapted to be triggered by an output pulse of the gate circuit; and said responding means comprises display means operated in response to an output pulse of the retrigger multivibrator.

3. A residual amount detecting device according to claim 2 wherein said responding means includes an integral circuit for integrating the output pulse of the retrigger multivibrator and a drive circuit adapted to be operated in response to a predetermined output level of the integral circuit to drive the display means.

4. A residual amount detecting device according to claim 2 in which the capacity detecting circuit section comprises:

an oscillator connected to the capacitor structure to generate an oscillation signal according to a capacitance variation of the capacitor structure;

a frequency-voltage converter for converting an oscillation frequency of the oscillator to a corresponding voltage; and a comparator for comparing the output voltage of the converter and the reference voltage of the reference voltage source; and said responding means comprises display means driven by an output of the comparator.

* * * * *